Figure 1:
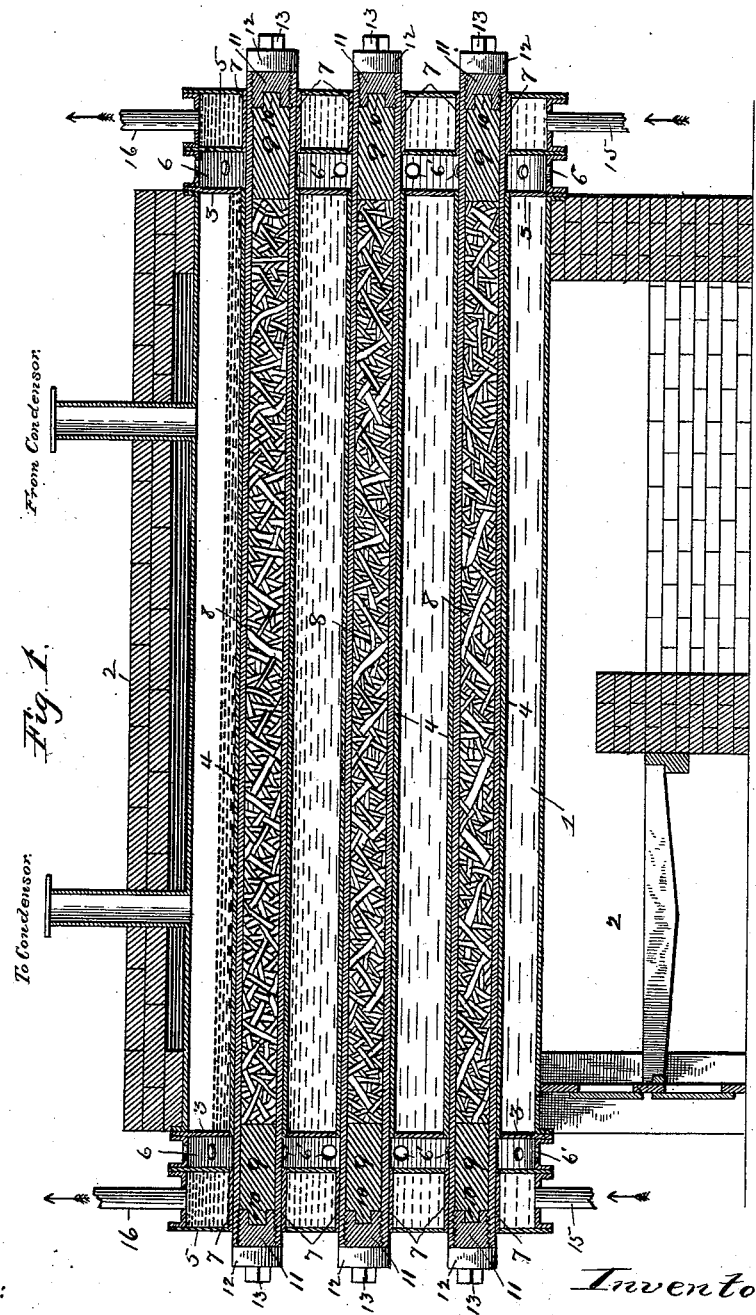

(No Model.)  2 Sheets—Sheet 1.

C. BARUS.
PROCESS OF MANUFACTURING LIQUID VULCANIZED RUBBER.

No. 538,147.  Patented Apr. 23, 1895.

Witnesses:
J. B. McGirr.
F. T. Chapman.

Inventor:
Carl Barus,
By Joseph Lyons,
Attorney (No Model.) 2 Sheets—Sheet 2.

C. BARUS.
PROCESS OF MANUFACTURING LIQUID VULCANIZED RUBBER.

No. 538,147. Patented Apr. 23, 1895.

Witnesses:
J. B. McGinn.
F. T. Chapman.

Inventor:
Carl Barus,
By Joseph Lyons.
Attorney.

UNITED STATES PATENT OFFICE.

CARL BARUS, OF WASHINGTON, DISTRICT OF COLUMBIA.

PROCESS OF MANUFACTURING LIQUID VULCANIZED RUBBER.

SPECIFICATION forming part of Letters Patent No. 538,147, dated April 23, 1895.

Application filed January 3, 1891. Serial No. 376,600. (No specimens.)

*To all whom it may concern:*

Be it known that I, CARL BARUS, a citizen of the United States, and a resident of Washington, in the District of Columbia, have invented certain new and useful Improvements in Processes of Manufacturing Liquid Vulcanized Rubber, of which the following is a specification.

My invention has reference to the production of liquid vulcanized rubber of all degrees of vulcanization, either from waste vulcanized or pure rubber, by the employment of a fluid capable of impregnating these rubbers. The impregnating fluid, upon exposure of the liquid vulcanized rubber to the air, rapidly evaporates, and leaves behind a vulcanized rubber having the coherence, elasticity and toughness of vulcanized rubber made by the ordinary processes. I am thus enabled to utilize scraps and wastes of rubber, which prior to my invention could either not be utilized at all, or only at such great expenditures of money and labor, as to render the old processes practically prohibitory.

It is a well-known fact that under ordinary temperatures and pressures, vulcanized rubber is practically insoluble in the vehicles which readily dissolve pure rubbers. When the temperature and pressure are greatly increased, and a superabundance of the solvent is used, vulcanized rubber may, in certain cases, be dissolved, but the solution thus obtained is usually dilute, and the evaporation of the solvent is consequently very slow, imperfect and expensive, irrespective of the great cost of the solvent itself. By reason of the imperfect evaporation of the solvent, which is unavoidable under the old process, the solution never solidifies so as to yield vulcanized rubber having the coherence, elasticity and toughness of ordinary vulcanized rubber.

My invention is designed to overcome these difficulties, and to render the utilization of waste rubber commercially practicable, and my invention is based upon the discovery, made by me, that if vulcanized rubber is immersed at ordinary temperatures, in carbon-disulphide, benzole, petroleum oils, or in any of the coal or coal-oil products of distillation, such as gasoline, benzine, naphtha and others, and in fact, in any hydro-carbon fluid, ether, chloroform, &c., it becomes impregnated with these fluids within a very short time, and when thus impregnated, will, without the generation of gases and without decomposition, become fluid when heated in a receptacle to a temperature considerably below the melting point of the vulcanized rubber, and under a pressure sufficient to prevent the boiling of the impregnating fluid. Based upon this discovery, I practice my invention by immersing waste rubber pieces (which are first cut into slices), in any one of the impregnating fluids named, or in any mixtures of the same, for a period of from a few minutes to several hours, and the impregnated material is then tranferred into retorts which are hermetically sealed and strong enough to withstand the vapor-pressure of the impregnating fluid. This retort is then heated to a temperature which need never exceed 200° centigrade, when said material readily liquefies, without generation of gases or decomposition. The fused mass then contains a relatively small proportion of the impregnating fluid, and it remains liquid on cooling. The impregnating fluid, however, rapidly evaporates on exposure to air, leaving behind the solid mass of vulcanized rubber in its original state of elasticity.

In pursuance of my invention, I can also make liquid vulcanized rubber, from pure rubber, in the manner hereinbefore indicated, by charging the impregnating fluid with sulphur, or by employing an impregnating fluid, in which sulphur is suspended, as for instance, a carbon-disulphide solution of sulphur, and if a sufficient quantity of sulphur is thus introduced, the resulting product will be liquid rubber of any desired degree of vulcanization. I am thus enabled to make not only the so-called gray rubbers, but also ebonite in liquid form.

The process which I have thus described in a general way, is preferably practiced by means of an apparatus which will permit of the uninterrupted continuance of the manufacture of vulcanized rubber solution from waste, or from pure or vulcanized rubber, and in the accompanying drawings, I have shown one form of apparatus which may be used with advantage; but it will be understood that I am not limited to the identical details of construction herein shown and described, since the same may be widely varied without departing from the fundamental principle of my invention. This fundamental principle, as will now be understood, is the impregnation of vulcanized rubber with a suitable fluid, or the impregnation of pure rubber or vulcanized rubber with a suitable fluid containing sulphur, and the melting of the impregnated mass under pressures which will prevent the vaporization of that fluid.

Figure 2:
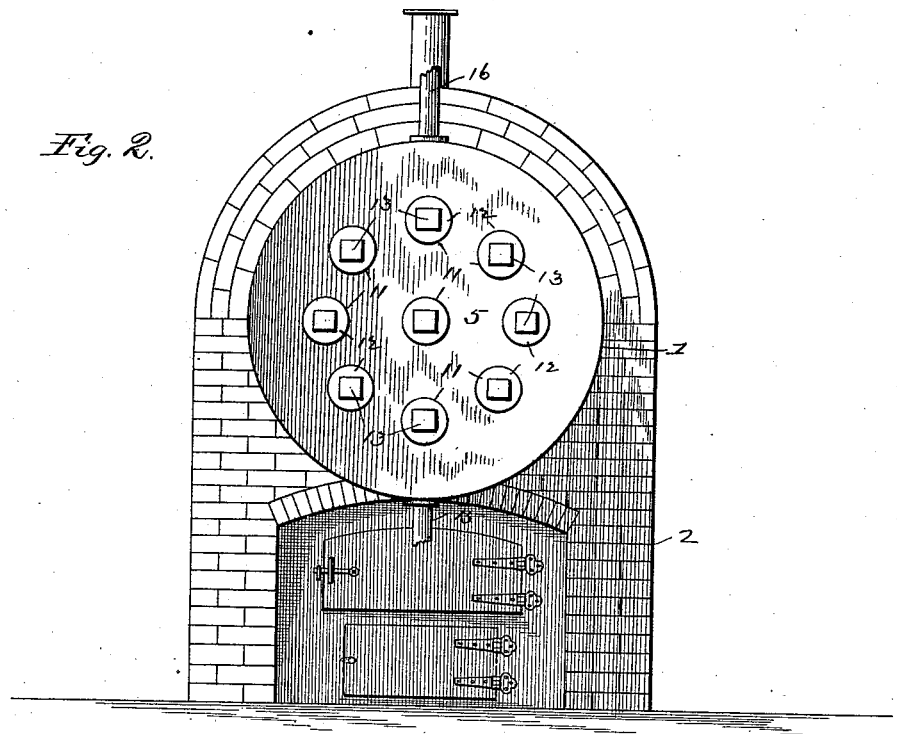
Figure 3:
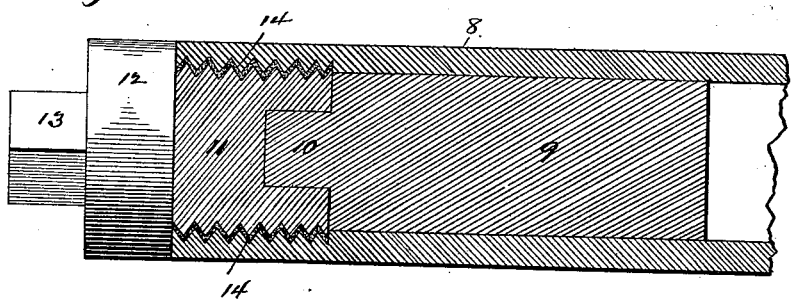

Figure 1 represents a longitudinal section of the apparatus for melting vulcanized rubber, in accordance with my invention. Fig. 2 is an end view of the same; and Fig. 3 is a longitudinal section, showing on an enlarged scale the construction of an end of the retorts which constitute a portion of my apparatus.

Like numerals of reference indicate like parts throughout the drawings.

A boiler 1, preferably cylindrical in shape, and made of iron, in the usual manner, is set in a furnace 2, of brickwork, constructed in any usual or improved manner. This boiler serves as the heating bath for the retorts hereinafter described, and is charged with paraffine, or any other suitable substance, the boiling-point of which is slightly higher than the temperature at which the impregnated mass of vulcanized rubber melts. This temperature I have ascertained to be between 160° and 200° centigrade, usually very near 175° centigrade. The fluid of the bath may be allowed to vaporize freely, in which case the charge has to be replenished from time to time; or the escaping vapors may be condensed and returned to the boiler, as indicated in the drawings. Passing through this boiler from end to end, and tightly fitted into the heads 3, 3, thereof, are a series of copper tubes 4, 4, symmetrically arranged in the manner indicated in Fig. 2. To each end of this boiler is fitted a water-jacket 5, being in effect a flat, cylindrical vessel, the diameter of which is equal to that of the boiler, and is separated from the latter by an air-chamber 6. The water-jackets are also provided with a series of tubes 7, 7, equal in size, number and location to the copper tubes 4, in the boiler, so that from one end of the structure to the other there is a series of cylindrical seats open at both ends, and destined to receive the cylindrical retorts 8, 8, which will presently be described.

The air-chambers 6, 6, have openings 6', 6', for the admission thereto and circulation therein of the surrounding air, and it is within my invention to dispense altogether with a specially constructed air chamber, and to construct the water-jackets independently of the boiler; in which case these water-jackets will be independently supported at a suitable distance from the boiler, so that there will be a free air space (corresponding to the air-chambers 6, 6), between each water-jacket and the boiler.

The retorts 8, are made of iron tubing, and of a length slightly exceeding the length of the boiler, with its attached air-chambers and water-jackets, and of a diameter to loosely fit the cylindrical seats formed by the copper tubes 4, and by the tubes 7, passing through the water-jackets, so that they may be inserted and withdrawn with ease. Each retort is closed at each end with a plug 9, of wood, or other poor conductor of heat, and this plug fits rather tightly into the tubular retort, and has formed at its outer end an offset 10, which may be grasped by a tool in the act of inserting and withdrawing the plug. The length of the plug is such that when the retort is in position in its cylindrical seat, the inner end of the plug will be fairly within the heated portion beyond the water-jacket and air-space, while the other (reduced) end will be within one or two inches from the end of the retort. The interior of the end of the retort is screw-threaded, and to the same is fitted a screw-plug 11, formed with a recess at its inner end, which loosely fits over the reduced portion, or offset 10, of the wooden plug. This screw-plug has also formed at its outer end a head 12, and a square or hexagonal projection 13, for the application of a wrench, for inserting and withdrawing the screw-plug.

It is of importance that each retort be hermetically sealed at each end, and that the seal be of such character that it will withstand considerable pressure, and I have found that this object is attained to perfection when the threaded portion of the screw-plug is covered with a layer of tin, or soft solder, or similar soft fusible metal, and I accordingly apply such layer, as indicated at 14. The tinning of the screw-plug is effected in any ordinary manner, but care must be taken that the tin adhere well to the plug, so that it may not peel off or become detached from the body. I have found by experiment that such a tinned screw-plug will withstand pressures as high as two thousand atmospheres without occasioning a leak.

Each water-jacket is charged by a continuous stream of cold water through pipes 15, 16, and while I have found that cold water is sufficient to keep the ends of the retorts at the required low degree of temperature, it will be understood that other, and more powerful cooling agencies, may be employed. The object of the wooden plugs and of the water-jacket is to keep the ends of the retorts sufficiently cooled to prevent the melting or softening of the tin on the screw-plugs, and at the same time, it is also convenient to have the ends of the retorts cool enough to permit the handling of the same with comfort.

With an apparatus constructed as described, my process is practiced as follows:— The rubber to be melted is first superficially cleansed in any desired manner, and is then cut, or may be cut, into strips which may be of any length, not exceeding the length of that portion of the retort which is seated within the copper tubes 4, 4. These strips are then placed in a vessel, preferably of iron, and the impregnating fluid is then poured over the mass sufficiently to cover it, and by preference the mass is slightly agitated, and turned over from time to time within the impregnating fluid. According to the nature of that fluid, and the required consistency of the liquid rubber to be obtained, the impregnation is continued from between a few minutes to several hours, by which time the vulcanized rubber is swelled and may even become gelatinous in appearance and to the touch. The impregnating fluid is then drained off, and the impregnated rubber is transferred into one of my improved retorts, which is well filled with the same, and hermetically closed by means of the wooden and screw-plugs hereinbefore described. The retort is now inserted into the seat of the heating bath, where it is raised to a temperature above 160° centigrade, but preferably not exceeding about 200° centigrade. After this temperature has been attained, the retort is allowed to remain in the bath from between ten to fifteen minutes, or more, and during this time, the retort may be turned about its axis, although this is not absolutely necessary. By the end of this time, the impregnated rubber will be found to be perfectly melted. The retort is now withdrawn from the bath, and opened at one end, and the fluid mass it contains is poured into receptacles, either for preservation in this condition, or for evaporation, to regain the solid vulcanized rubber.

Vulcanized rubbers of different kinds require different degrees of temperature for melting, but since rubbers of the highest degrees of vulcanization will melt when impregnated in the manner hereinbefore described, at a temperature below 200° centigrade, usually at about 175° centigrade, and since no injury is done to rubbers of any kind when exposed to a temperature of 200° centigrade, under the conditions provided for by my invention, it is preferable, for the sake of simplicity and uniformity of procedure, to keep the bath at that temperature. If this is done, it is quite practicable to charge the retort with mixtures of all kinds of rubber scrap, irrespective of their various degrees of vulcanization, and when thus melted together in the same retort, the product obtained is a melted rubber, the vulcanization of which is the average of the vulcanizations of the different kinds of rubber used.

With the apparatus constructed in accordance with my invention, the process can be practiced continuously upon a commercial scale, requiring only unskilled labor for charging and emptying the retorts.

When the impregnating fluid used in this process contains sulphur, the resulting product will be a liquid rubber of a higher degree of vulcanization than that of the rubber used in the process, and I am thus enabled to make liquid ebonite by using either pure rubber, or a rubber of a lower degree of vulcanization, with carbon-disulphide as the impregnating fluid; or in place of carbon-disulphide, I may use any other impregnating fluid containing sulphur in solution.

I am not limited to the use of the substances hereinbefore recited as an impregnating fluid, but may use any fluid capable of dissolving pure rubber either at ordinary or at higher temperatures; but for the purpose of vulcanizing pure rubber, or of still further vulcanizing vulcanized rubber, the impregnating fluid must be such as is capable of dissolving sulphur, as will now be readily understood.

The fluid rubber obtained by my process may be used for the manufacture of solid sheets or blocks of vulcanized rubber, and owing to the relatively small amount of impregnating fluid, the evaporation of the latter is effected very rapidly by any of the known means used for this purpose, but in addition thereto, the fluid rubber may be used with great advantage as a cement, for making seams in rubber articles, since this fluid, when solidified, becomes vulcanized rubber having all the characteristics which the same possesses originally, when discharged from the vulcanizing muffle.

Owing to the rapid solidification of rubber melted in accordance with my invention when exposed to the air, thin sheets of vulcanized rubber may be made with ease, by simply spreading the fluid as a thin layer, upon a suitable base, and allowing it to solidify, by simple exposure to air.

It is also practicable to provide continuous electric conductors, like copper wires, with an insulating coating of vulcanized rubber, by slowly passing such wire through the fluid mass. I have thus insulated copper and steel wires, and the rubber coating thus produced upon the same adhered well to the wires, and was as soft and elastic as if the vulcanized rubber had been newly manufactured.

For the practice of my invention, it is not absolutely necessary that each end of the retort be provided with the plugs which I have shown and described, since it is quite practicable that one of the ends be permanently closed. The construction shown, however, is preferable, since it permits the thorough cleansing of the retorts.

It will be understood that the fluid vulcanized rubber produced by my process may be diluted in any degree, by the addition thereto of the impregnating fluid used in the particular case, and in fact, by the addition of any other fluid which might have been used as an impregnator. When thus diluted, the liquid rubber may be used in the manner of a varnish, and may be applied to all kinds of articles which it is desired to make water-proof. The application of such varnish produces within a very short time, a thin layer of vulcanized rubber upon the article treated, the rubber being solid and elastic, and not sticky, as is the case with varnishes of this kind heretofore used.

Having now fully described my invention, I claim and desire to secure by Letters Patent—

1. The process of making liquid vulcanized rubber, which consists in first impregnating rubber at any stage of vulcanization with carbon disulphide, and then subjecting the mass to the action of heat in a hermetically closed vessel, until it is melted down to a homogeneous mass, substantially as described.

2. The process of making liquid vulcanized rubber, which consists in first impregnating rubber at any stage of vulcanization with a solution of carbon disulphide and sulphur, and then subjecting the impregnated rubber to the action of heat in a hermetically sealed vessel, until it is melted down to a homogeneous mass, substantially as described.

3. The herein described composition of matter, consisting of a liquid, homogeneous, molten mass of rubber, sulphur and carbon disulphide, substantially as described.

In testimony whereof I have signed my name to this specification in the presence of two subscribing witnesses.

CARL BARUS.

Witnesses:
JOSEPH LYONS,
F. T. CHAPMAN.